United States Patent [19]

Holmes et al.

[11] Patent Number: 5,748,842
[45] Date of Patent: *May 5, 1998

[54] SYNCHRONIZING DIGITAL AUDIO TO DIGITAL VIDEO

[75] Inventors: Daniel J. Holmes, Marlboro; John W. Molnar, Chelmsford; Morton H. Tarr, Bolton, all of Mass.

[73] Assignee: Media 100 Inc., Marlboro, Mass.

[*] Notice: The term of this patent shall not extend beyond the expiration date of Pat. No. 5,506,932.

[21] Appl. No.: 629,528

[22] Filed: Apr. 8, 1996

Related U.S. Application Data

[63] Continuation of Ser. No. 49,987, Apr. 16, 1993, Pat. No. 5,506,932.

[51] Int. Cl.$^6$ .................................................. G10L 3/00
[52] U.S. Cl. ........................................ 395/2.79; 395/200.04
[58] Field of Search ..................................... 395/2.14, 154, 395/200.04, 275, 2.79, 2.09, 2.67, 2.2, 200.01, 200.02, 200.03, 200.08, 200.13

[56] References Cited

U.S. PATENT DOCUMENTS

| | | | |
|---|---|---|---|
| 4,851,909 | 7/1989 | Noske et al. | 348/512 |
| 4,970,663 | 11/1990 | Bedell et al. | 395/139 |
| 4,974,178 | 11/1990 | Izeki et al. | 395/778 |
| 5,014,267 | 5/1991 | Tompkins et al. | 370/259 |
| 5,045,940 | 9/1991 | Peters et al. | 348/472 |
| 5,164,839 | 11/1992 | Lang | 386/54 |
| 5,168,247 | 12/1992 | Tarr | 331/111 |
| 5,192,999 | 3/1993 | Graczyk et al. | 348/552 |

FOREIGN PATENT DOCUMENTS

| | | | |
|---|---|---|---|
| 0 279 411 | 8/1988 | European Pat. Off. | H04N 7/08 |
| 0 406 595 | 1/1991 | European Pat. Off. | H04N 5/92 |
| 60-153680 | 8/1985 | Japan | H04N 5/782 |
| 4-285769 | 10/1992 | Japan | H04N 5/85 |

OTHER PUBLICATIONS

News Release entitled "Media 100™—Industry's First Online, Nonlinear Video Production System Introduced by Data Translation's Multimedia Group" dated Jan. 11, 1992.
"Multimedia Group Strategy and Media 100™ Backgrounder" dated Feb. 1992.
"Anouncing a totally new concept in the field of video post production" distributed Jan. 1992.
Bush et al., "Digital Sound Processing for Digital Video", IEEE/Sep. 1990.
Pasquale, "System Software and Hardware Support Considerations for Digital Video and Audio Computing", IEEE/Jan. 1993.

Primary Examiner—Allen R. MacDonald
Assistant Examiner—Richemond Dorvil
Attorney, Agent, or Firm—Fish & Richardson P.C.

[57] ABSTRACT

An audio/video input/output (I/O) port apparatus for acquiring digital audio samples from one or multiple channels of input audio and synthesizing digital audio samples into one or multiple channels of output audio. The apparatus comprises a video I/O port, a frequency synthesizer, and an audio I/O port. The video I/O port generates a video-rate clock, and is configured to digitize input video into digital video, and to synthesize output video from digital video. The frequency synthesizer is configured to derive an audio sampling clock based on the video-rate clock. The audio I/O port is configured to sample input audio and convert it into digital audio samples according to the sampling clock, and to synthesize digital audio samples into output audio according to the sampling clock. The apparatus ensures that the video and audio data track together, both when inputting the information from an external source and when outputting the audio/video data streams. The technique is particularly valuable in video editing, where it is critical to establish and maintain synchronization between the video of a speaking person and the audio representing the spoken material.

28 Claims, 4 Drawing Sheets file 1: video track file 2: audio left channel file 3: audio right channel file 4: clip assembly

SYNCHRONIZING DIGITAL AUDIO TO DIGITAL VIDEO

CROSS REFERENCE TO RELATED APPLICATIONS

This is a continuation of application Ser. No. 08/049,987, filed Apr. 16, 1993 U.S. Pat. No. 5,506,932.

Patent applications entitled "Displaying a Subsampled Video Image on a Computer Display," "Adaptive Video Compression," "Adaptive Video Decompression," and "Video Peripheral for a Computer," filed herewith, are incorporated herein by reference.

BACKGROUND OF THE INVENTION

The invention relates to digital processing of video and audio data, and more particularly to an audio/video input/output port apparatus that maintains synchronization between video and audio channels.

As the costs of high-resolution color computer displays and processing power come down, one of the emerging applications for microcomputers is video post production—displaying and editing video images using the display of the computer as the monitor during the editing process. In a computer video editing system, a video/audio source, typically a video tape recorder, is read, and the data are stored in digital form on the disk of a computer. The video/audio data may be played back, edited, and written back to a video device.

Prior methods for digital processing of video/audio data have allowed the audio portion of the program to drift from the video portion, resulting in the loss of synchronization.

SUMMARY OF THE INVENTION

The invention provides an apparatus that synchronizes two or more streams of data, one stream representing video information and the other(s) representing audio information. The apparatus ensures that the video and audio data track together, both when inputting the information from an external source and when outputting the separate or joined audio/video data streams. The technique is particularly valuable in video editing, where it is critical to establish and maintain synchronization between the video of a speaking person and the audio representing the spoken material.

In general, in one aspect, the invention features an audio/video input/output (I/O) port apparatus for acquiring digital audio samples from one or multiple channels of input audio and synthesizing digital audio samples into one or multiple channels of output audio. The apparatus comprises a video I/O port, a frequency synthesizer, and an audio I/O port. The video I/O port generates a video-rate clock, and is configured to digitize input analog video into digital video, and to synthesize output analog video from digital video. The frequency synthesizer is configured to derive an audio sampling clock based on the video-rate clock. The audio I/O port is configured to sample input audio into digital audio samples according to the sampling clock, and to synthesize digital audio samples into output audio according to the sampling clock.

In a second aspect, the invention features an audio/video input port apparatus for acquiring one or multiple channels of digital audio samples. The apparatus comprises a video input port, a frequency synthesizer, and an audio input port. The video input port is configured to digitize input video into digital video and generate a video-rate clock. The frequency synthesizer is configured to derive an audio sampling clock based on the video-rate clock. The audio input port is configured to sample input audio into digital audio samples according to the sampling clock.

In a third aspect, the invention features an audio/video output port apparatus for synthesizing digital audio samples into output audio/video. The apparatus comprises a video output port, a frequency synthesizer, and an audio output port. The video output port is configured to synthesize output video from digital video and generate a video-rate clock. The frequency synthesizer is configured to derive an audio sampling clock based on the video-rate clock. The audio output port is configured to synthesize output audio from digital audio samples according to the sampling clock.

Preferred embodiments of the invention may include the following features. The audio/video I/O port apparatus may be a video front end to a video peripheral board mounted in a peripheral slot of a general purpose host computer. There may be first-in-first-out buffers (FIFOS) to couple the asynchronous operation of the computer to the synchronous operation of the video and audio input and output ports. The peripheral board may have a CODEC for compressing and decompressing the video data as they are stored and retrieved on a storage device of the host computer. The video input port may also include a detector configured to detect the synchronizing signals of the input video, a frequency generator for generating the video-rate clock and clocking the video output port, and a pulse generator configured to provide an input synchronization pulse generated for each frame of the input video and based on the detected synchronizing signal, and a pulse generator configured to provide a synchronizing pulse to the audio output port. The video I/O port may generate the video-rate clock independent of both input and output video. The frequency synthesizer may include an m/n phase lock loop to generate the audio sampling clock as a ratio of the video-rate clock. The electronic implementation of the frequency synthesizer may allow the ratio of the audio sampling clock to the video-rate clock to be varied rapidly depending on the timing of the video-rate clock. The frequency synthesizer may also include an oversampled clock synthesizer that generates an oversampled clock whose frequency is at least twice as great as the frequency of the audio sampling clock, and a frequency divider that frequency divides the oversampled clock to generate the audio sampling clock. The audio/video I/O port apparatus may further comprise a digital signal processor (DSP) programmed to selectively associate a varying number of digital audio samples to each respective frame of the digital video in order to achieve a precise ratio of the number of digital audio samples to the number of associated video frames. The audio/video I/O port apparatus includes an analog-to-digital converter and/or a digital-to-analog converter, the converters being clocked by the audio sampling clock. The DSP controls the flow between the FIFOs.

Among the advantages of a digital video processor incorporating to the invention are the following. When audio and video tracks are recorded and later played back, the audio and video will be properly synchronized—the audio will not run ahead of the video nor vice versa. The audio tracks of a video may be stored separately from the video track; this facilitates editing of both the audio and the video tracks. The technique is independent of the incoming video and audio signal formats; i.e., the technique works for different video formats (e.g. NTSC and PAL) and for different audio sampling and/or playback rates.

Other advantages and features of the invention will be apparent from the following description of a preferred embodiment thereof and from the claims.

DESCRIPTION OF THE PREFERRED EMBODIMENTS

The preferred embodiment will now be described.

DRAWINGS

OVERVIEW

Figure 1:
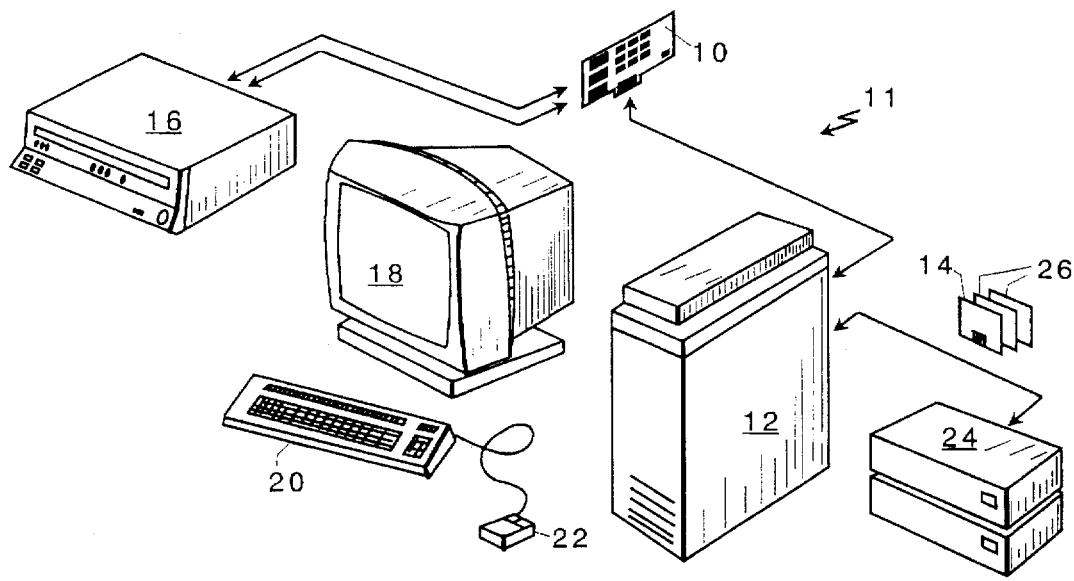
FIG. 1 is a diagrammatic perspective view of components used in a video editing system operating according to the invention.
Figure 2:
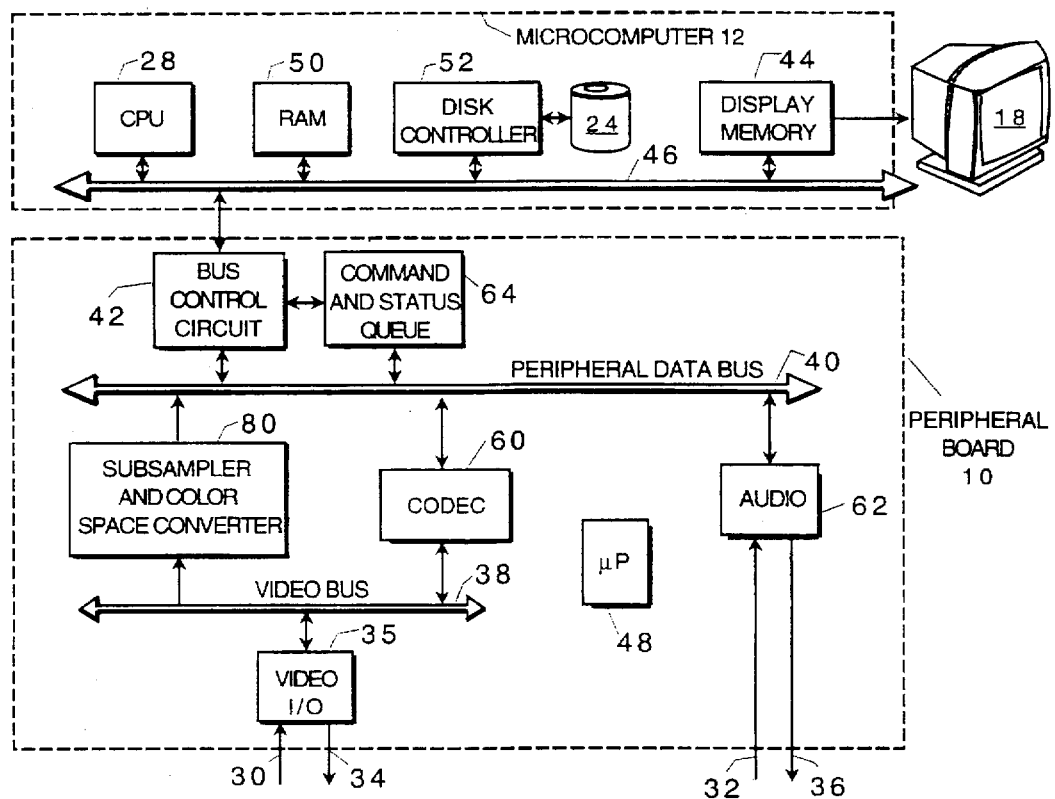
FIG. 2 is a block diagram of a host computer and a video peripheral board used in the system of FIG. 1.

Referring to FIGS. 1 and 2, video editing system 11 includes peripheral board 10 that plugs into host computer 12. Other components include video tape recorder (VTR) 16, monitor 18, keyboard 20, mouse 22, and mass storage disk 24. The software providing video editing functionality is divided into two portions, one portion 26 that executes on the host computer's central processing unit (CPU) 28, generally providing a user interface and supervision, and one portion 14 that executes on the peripheral board, generally controlling the peripheral board, data transfer within the peripheral board, and data transfer between the host computer and the peripheral.

In video editing system 11, video is read through video input port 30, and audio is read through audio input port 32. As they are read, the video is digitized and compressed, and the audio is digitized. The video and audio are stored on disk 24. The compressed video/audio data may be decompressed and played back onto display 18 and speakers (not shown). Video editing software 26 allows a user to assemble portions of the compressed video and audio into a video/audio program. As the user edits the program, he can play it and rearrange it in small increments, as small as a single frame, or in assembled combination. Once the user is satisfied with the resulting program, it can be output at full frame rates through video output port 34 and audio output port 36 to a video capture device, e.g. VTR 16, or to a broadcast device.

Referring to FIG. 2, the peripheral board has video and audio ports 30–36 (to connect VTR 16 or other video device), bus control circuit 42 (to interface with host computer 12), various signal processing paths, and supervisory microprocessor 48. The paths include a two-way path through a compression/decompression coder/decoder (CODEC) 60 to transfer digitized video to or from host computer disk 24, and a one-way color-space conversion (CSC) and subsample path to display digitized video on host computer display 18. Video input/output (I/O) circuit 35 converts the video data from the VTR's analog form, e.g. NTSC or PAL, to a digital form, e.g., YUV 4:2:2 format, and puts the digital video on video bus 38. (Video bus 38 can also be written by CODEC 60 during video decompression.) A microprocessor 48 controls the components of the peripheral board.

During inputting of video, CODEC 60 takes the YUV format video from video bus 38, compresses it into a compressed form, and stores the compressed video into compression FIFO 92. Bus control circuit 42 takes the compressed video data from compression FIFO 92 and stores them into buffers in the host's RAM 50. Host CPU 28 periodically flushes the buffers to disk 24. Simultaneously, an audio channel transfers data from VTR 16 (or other audio source) to the peripheral's data bus 46 through an audio input port 32 and controller 62.

During playback, the process is reversed: host CPU 28 reads the compressed video data from disk 24 into buffers in RAM 50. Bus control circuit 42 copies the data from the buffers to decompression FIFO 94. CODEC 60 drains the decompression FIFO 94, decompresses the data, and outputs them to video data bus 38. From there, the decompressed video data can be displayed to the host's display 18 through the subsample path, and/or output through video output port 34. Simultaneously, the audio channel transfers data from the peripheral's data bus 40 through audio controller 62 and audio output port 36 to the VTR.

Figure 3:
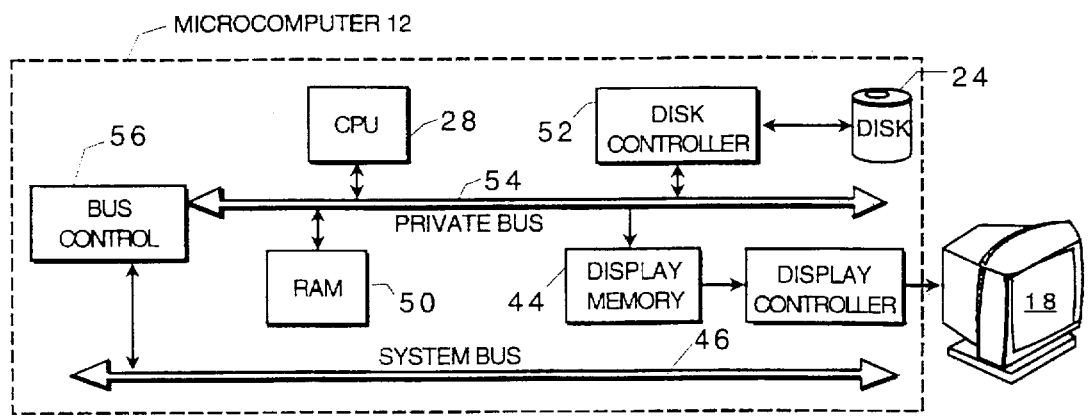
FIG. 3 is a block diagram of an alternate organization of the host computer.

In an alternate organization of the host computer shown in FIG. 3, host computer CPU 28, display memory (also called a "frame buffer") 44, main memory 50, and/or disk control 52 components may transfer data through a bus 54 private to host computer 12, with bus control interface 56 between the private bus 54 and system bus 46. In this case, the peripheral's bus control circuit 42 transfers data to/from the system bus 46, and the host's bus interface 56 further directs the data to/from the devices on the host computer's private bus 54.

In any video signal, there is a vertical blanking period to reset the retrace from the bottom of the screen to the top of the screen. During the vertical blanking period, the electron beam is stopped so that it will not overwrite the previous field. During the vertical blanking period, there occurs a synchronization pulse called the "vertical synch" pulse. In interlaced formats (having two interlaced fields per frame), there are two vertical blanking periods per frame, and thus two vertical synch pulses, one at the end of each field. The two vertical synch pulses can be distinguished by their timing relationships to the actual image data of the two fields of a frame.

STRUCTURE

The apparatus of the invention implements a clocking scheme for recording and/or playing back one or more audio tracks, especially when that audio is synchronized to a video track. The apparatus uses the video-rate clock pulses embedded in the video to drive a frequency converter that, in turn, generates an audio sampling clock, e.g., at 44.1 KHz. The audio sampling clock is used to drive an audio port.

Video I/O port circuit 35 extracts two clocks from the input video data: the pixel-rate line-locked clock 140, either 12.27 MHz for NTSC or 14.75 MHz for PAL, and a once-per-frame synch pulse 142, 29.97 Hz for NTSC or 25 Hz for PAL. On output, video I/O port circuit 35 synthesizes the video clocks to drive the output. Video I/O port circuit 35 is also configured to synthesize the video-rate clocks, both pixel-rate clock 140 and synch pulse 142, even if no actual video is being input or output, so that the video clocks can be input to frequency synthesizing components used in inputting and outputting audio, as discussed in detail below. In the latter mode of operation, the invention can be used to input or output audio independent of any video operation, for instance to input a new audio track to replace the audio track with which video data were originally recorded. Video I/O port circuit 35 may input or output composite or S-video.

Pixel-rate clock 140 is fed to programmable m/n phase lock loop 144, described further below, in connection with FIG. 5. Phase lock loop 144 generates an oversampled audio clock 146, for instance at 256 times the audio sampling rate. The oversampled clock is then frequency divided down by countdown divider 148 to audio sampling clock 150 of, e.g., 44.1 KHz. M/n phase lock loop 144 and countdown divider 148 thus together make up a frequency synthesizer that derives an audio sampling clock based on a video-rate clock, namely line-locked pixel rate clock 140. Audio sampling clock 150 is then used to clock sampling of the audio input at analog-to-digital converter (ADC) 152 or synthesis of the audio output at digital-to-analog converter (DAC) 154. Deriving audio sampling clock 150 from the video clock ensures that the audio data are directly synchronized to the video data on a sample-by-sample basis.

The audio data should also be synchronized to the video data on a frame-by-frame basis, since there may not be an integer number of audio samples for each frame of video. To handle this, synch pulse 142 of the video clock is provided from video I/O port circuit 35 to digital signal processor (DSP) 160 as a frame interrupt. The interrupt service routine in DSP 160 adjusts the samples to the video frame rate as will be described below. DSP 160 may be, preferentially, a Texas Instruments TMS320C31. In addition to synchronizing audio samples to video frames on input, DSP 160 also controls the flow of data from/to the ADC FIFO 176 and DAC FIFO 186, as will be discussed below, and does a real time mix of multiple audio channels to create two output channels.

Since the rate of video clock 140 differs depending on whether the video is in NTSC or PAL format, the ratio between the pixel rate line-locked clock 140 and the derived oversampling clock 146 is adjustable to yield a fixed audio sampling rate 150. This is achieved by m/n phase lock loop 144, which is shown in FIG. 5 and provides this capability by allowing the values of m and n to be programmed through the use of counters 310 and 312. Thus, the ratio of pixel-rate clock 140 to oversampling clock 146 can be adjusted to any rational number. For NTSC and a 44.1 KHz audio sampling clock, the m/n values are 2423/2634, for PAL they are 2287/2988. A 48 KHz sampling clock can be achieved by NTSC m/n values of 2413/2410 and PAL values of 2800/3361. A divide-by-n frequency synthesizer is disclosed in U.S. Pat. No. 5,168,247.

Figure 5:
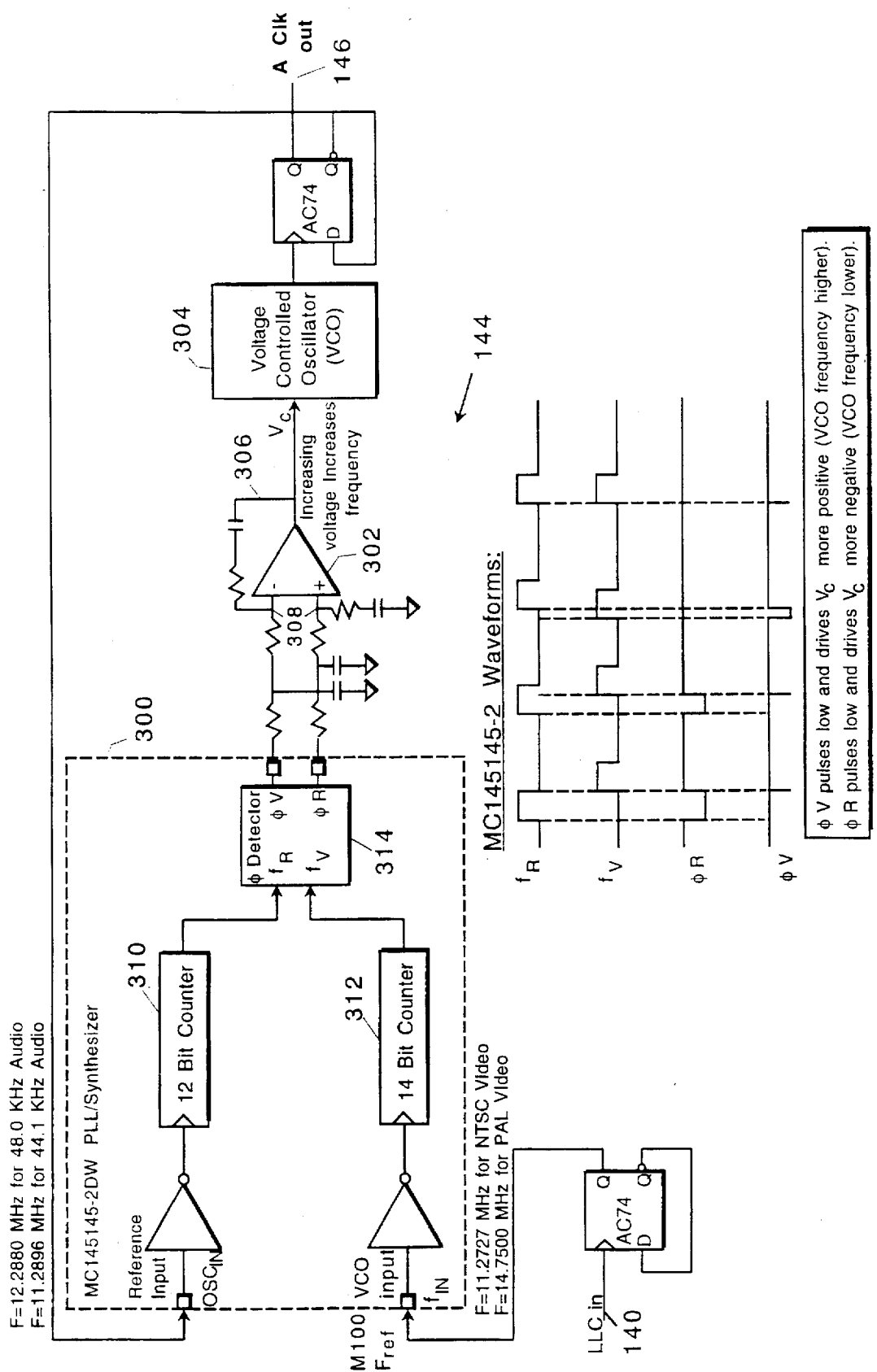
FIG. 5 is a block diagram of an m/n phase lock loop of the FIG. 4 components.

Referring to FIG. 5, m/n phase lock loop 144 includes Motorola MC145145 PLL/Synthesizer 300, op amp 302, and voltage controlled oscillator (VCO) 304, and components 301, 303. PLL/synthesizer 300 incorporates two counters 310, 312 and phase comparator 314, and a 4-bit bus interface. Counter 312 counts down from m at the reference frequency, the pixel rate line-locked clock 140 input from video circuit 35. Counter 310 counts down from n at the output audio sampling clock 146 rate. The values of m and n can be programmably entered. The outputs of PLL/synthesizer 300 are phase signals, which are fed to op amp 302. Op amp 302 produces a trimmer signal 306 to tune the output of VCO 304 to the desired frequency, producing oversampling clock 146.

The values of m and n can be adjusted (programmed) to accommodate any video rate and still produce the desired sampling clock (e.g., 44.1 KHz). PLL 144 quickly adjusts to changes in the video clock. This is important because video tapes do not always yield fixed rate video clocking: however the circuit keeps the proper number of samples per frame regardless of the timing (clocking) of any specific frame.

Figure 4:
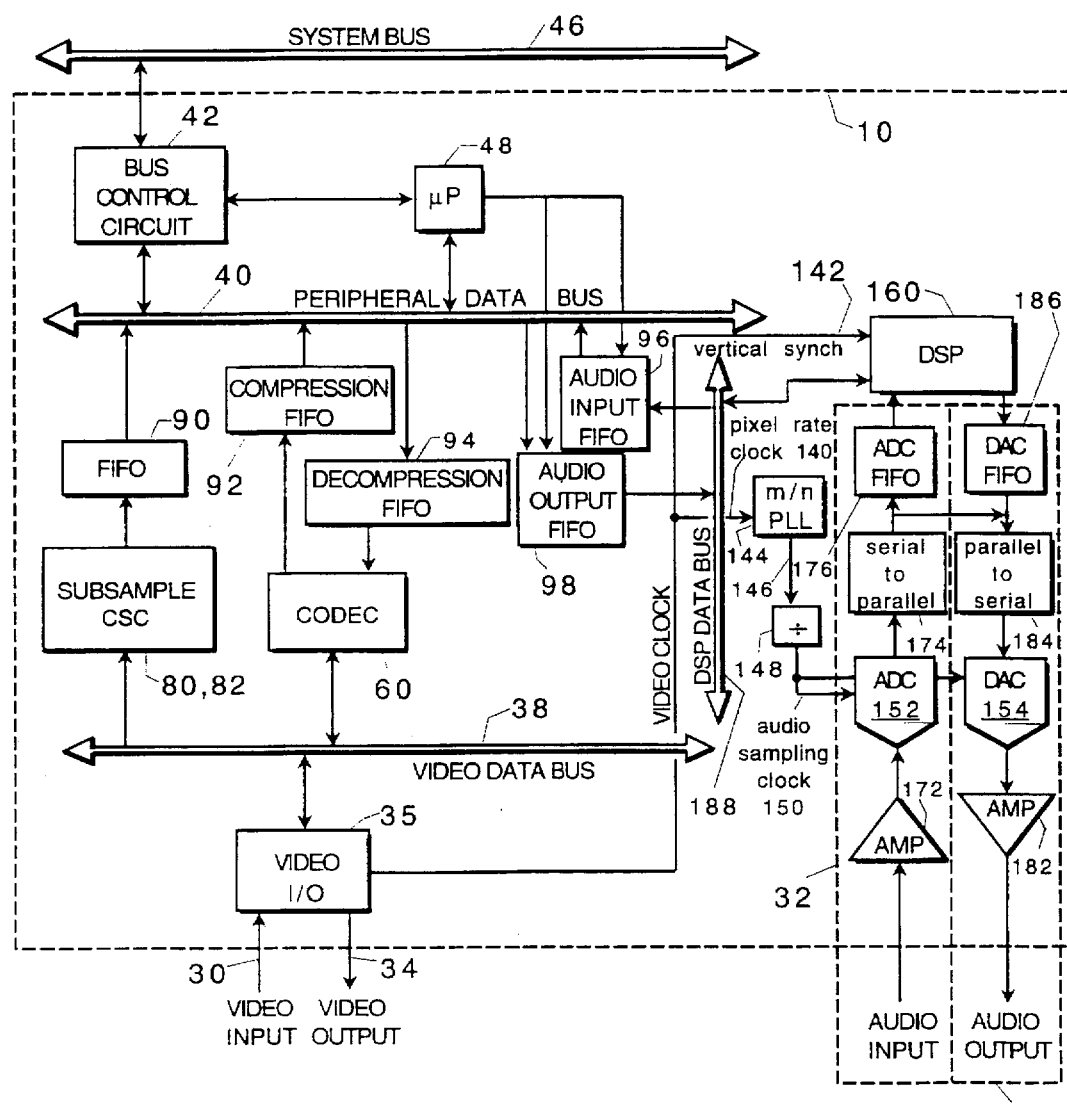
FIG. 4 is a block diagram detailing the components of the audio channel of the video editing system and the components that contribute to synchronizing audio to video.

Referring again to FIG. 4, the following discussion presents the structure and operation for each channel; typically the system will record and reproduce stereo, so the circuitry is duplicated for a second audio channel.

Each audio input port 32 includes amplifier 172, ADC 152, serial-to-parallel converter 174, and ADC FIFO 176. Each audio output port 36 comprises DAC FIFO 186, parallel-to-serial converter 184, DAC 154, and amplifier 182. FIFOs 176 and 186 are 32 bits wide (for two channels, each 16 bits wide), 256K deep, using 20 megasample/second parts. ADC 152 and DAC 154 are 16 bits wide, but the digital data are communicated bit serially. Serial-to-parallel converter 174 and parallel-to-serial converter 184 convert the bit-serial stream to the 16-bit parallel stream and vice-versa.

Figure 6:
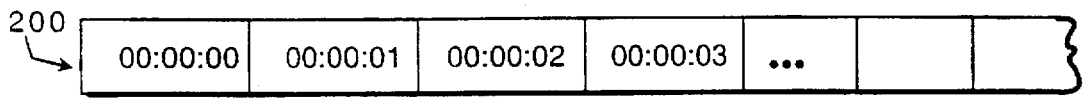
FIG. 6 is a diagram showing the files that store the video and audio tracks of a video clip.
Figure 6:
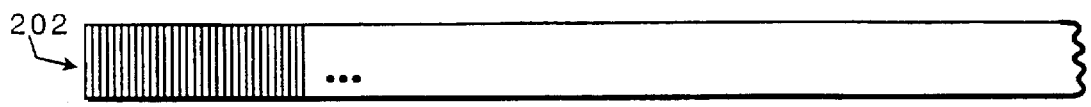
Figure 6:
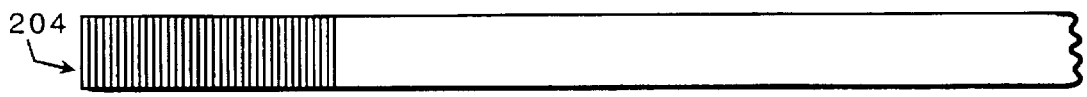
Figure 6:
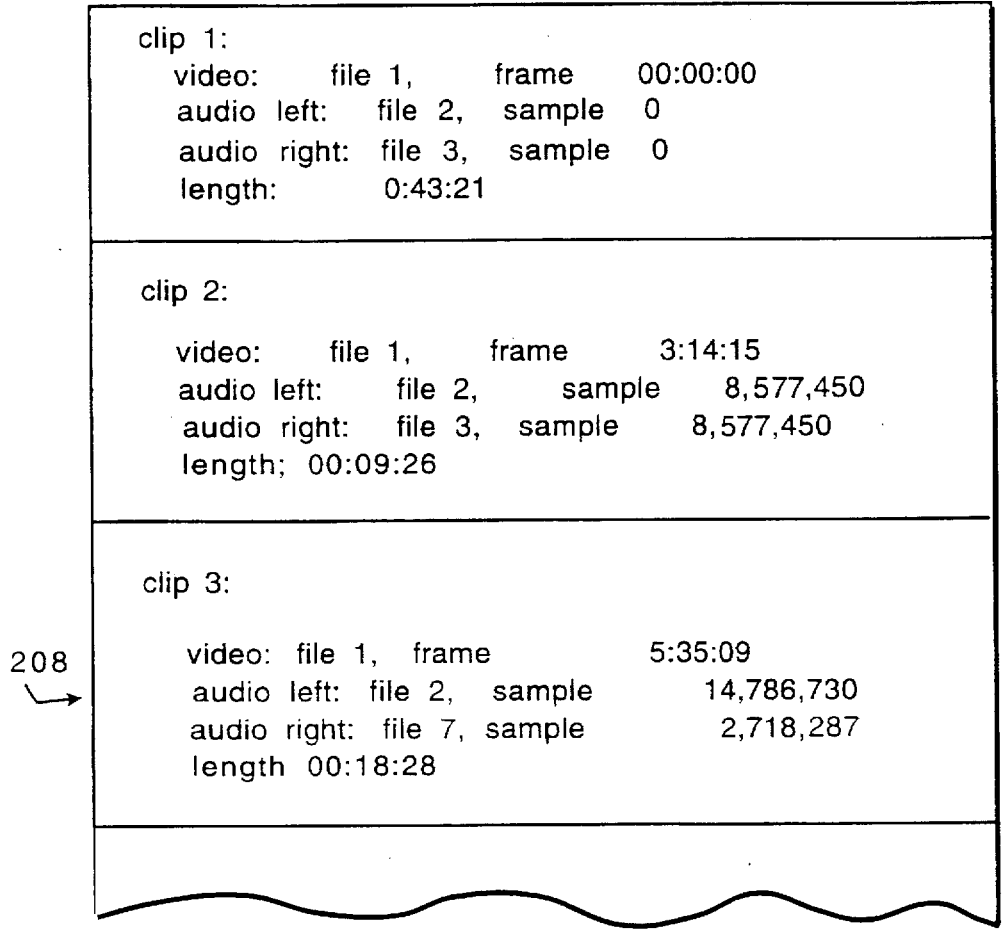

Referring to FIG. 6, the three tracks of a program read at video input port 30 and audio input port 32 are stored on host's disk 24 in four files. The first file 200 stores the compressed video images per se; each frame is identified by a time stamp. The second and third files 202, 204 hold the sampled audio for the left and right audio channels, respectively. The audio samples for each channel are stored in the single-channel SoundDesigner II format files, in which each audio sample is stored as 16 bits. The samples are simply ordered by occurrence in the file and identified by an integer sample number. The fourth type of file 206 contains clip descriptors, each clip descriptor pointing to portions of the video and audio files to be used in the edited final program. Each clip descriptor points into combinations of video files and one or more of the audio files containing the actual video and audio information. As the user edits the program, the actual compressed video image or audio sample data need not be copied from disk file to disk file; the editing is performed by manipulating the pointers in the clip descriptor file. Then during playback (or recording onto a video device, e.g. a VTR), the clip descriptor files are read in order. For each clip, the indicated video frames and audio samples are read from the disk and presented to the video and audio output ports, and synchronized as discussed below.

OPERATION

Referring again to FIG. 4, video I/O circuit 35 generates line-locked clock 140 at the pixel rate and synch pulse 142 at the frame rate. Line-locked pixel rate clock 140 may either be based on video read into video I/O port circuit 35 or may be synthesized by video I/O port circuit 35 independent of any video so that audio can be recorded or played back in the absence of video. Depending on whether the video is NTSC or PAL format, the pixel rate, and thus the frequency of line-locked pixel rate clock 140, varies. The values of m and n are chosen so that m/n phase-lock loop 144 accurately scales line-locked pixel rate clock 140 to produce oversampled audio clock 146, for instance 256 times the audio sampling rate of 44.1 KHz. Frequency divider 148, for instance a countdown-by-256 circuit, produces audio sampling frequency 150, e.g., 44.1 KHz. The audio sampling frequency can be used either for recording audio input or reproducing audio output.

Audio input, with or without video input, proceeds as follows. Input ADC 152 accepts analog audio input from an external audio device through audio input port 32, and samples the audio at the rate determined by the audio sampling frequency. The samples are presented in bit-serial form from ADC 152; this is converted to 16-bit parallel form by serial-to-parallel converter 174, and then reformatted into 32-bit words and queued in ADC FIFO 176. Because the data are queued in ADC FIFO 176, DSP 160 can empty ADC FIFO 176 at its leisure and need not constantly monitor an input line to pick up each bit of the input serial stream.

Periodically, e.g., once every 25th or 29.97th of a second on, respectively, a PAL or NTSC frame boundary, video I/O circuit 35 outputs frame synch signal 142. Frame synch 142 is connected to an interrupt line of DSP 160. DSP 160 may service the interrupt by adjusting the samples just before and/or just after the frame boundary to line the audio samples up with the video frame. For PAL video, whose 25 frames per second is an exact submultiple of the audio sample rate of 44,100 samples per second, no adjustment is needed, and each frame has 1,764 audio samples associated with it. For NTSC video, with a frame rate of 29.97 frames per second, which is not an even submultiple of the audio sampling rate, the system allocates the audio samples to frames to maintain close synchronization between the audio and the video. DSP 160 alternates the number of samples allocated per frame between 1471 and 1472. In this way, the audio and video information closely track to within 1.71 samples in 200 seconds, or 17.1 samples in 33 minutes.

To provide verification of the audio being input to the system, the input audio data stream is fed back to audio output circuit 36, via the line connecting the output of serial-to-parallel converter 174 to the input of parallel-to-serial converter 184, so that the user can monitor the audio data as it is recorded by the video/audio system.

From DSP 160, the sampled audio is placed on DSP data bus 188. From there, it is stored in audio input FIFO 96 before bus control circuit 42 takes the audio data and stores them into disk buffers in RAM 50 of the host computer. Host CPU 28 then flushes the disk buffers to disk 24.

Generally, simultaneously with digitizing and storage of audio, video is digitized, compressed by CODEC 60 and stored on disk 24. The data paths (video and two audio) through the peripheral and host may treat the three streams as independent processes. No additional processing is required during recording to produce correlation markers that annotate the relationship of specific frames with specific audio samples. No disk data structures are required to record the association, except to point to the first datum of each stream, until the associations are disturbed or reordered during video editing.

Audio output, with or without video output, proceeds as follows. The three streams may again be treated as independent, without explicit synchronization handshaking between them. Because the audio output sampling clock is driven by the video clock, all that is required is that the correct number of frames or samples be presented to the video and audio output ports 34, 36. The synchronized clocks will ensure that the output is presented to the analog video device at precisely synchronized rates.

During playback, video I/O circuit 35 generates a very accurate output clock that establishes the proper timing of the video played back, regardless of timing variations that may have occurred during recording. (Recorded audio may be played back without any associated video; video I/O circuit 35 can synthesize video clocks 140, 142 even in the absence of any actual video data.) Host CPU 28, the peripheral's microprocessor 48, and bus control circuit 42 cooperate to move video and audio data from the host's disk 24 to decompression FIFO 94 and audio output FIFO 98 at rates that ensure that the FIFOs remain non-empty. DSP 160, in turn, drains the audio data from the audio output FIFO 98 into DAC FIFO 186.

As video/audio output starts, sampling clock 150 is blocked from audio output DAC 154 until the first frame of video is decoded by CODEC 60 and ready to be output on video output port 34. Thus, while waiting for video output port 34 to start, the audio data are queued in DAC FIFO 186 awaiting a synchronization signal from the video output circuit 35 and for audio sampling clock 150 to begin. As the first frame of video is presented to video output port 34, audio sampling clock 150 is unblocked, and DSP 160 enables parallel-to-serial converter 184 to drain DAC FIFO 186 into DAC 154.

Once audio output is under way, no further synchronization between the three data paths is required, only the clock synchronization. Because audio sampling clock 150 is derived from video clock 140, 142, the rate at which audio samples are output at audio output port 32 is forced to remain synchronized with the rate at which video frames are output at video output port 34. Since DAC 154 converts the sampled audio at the rate dictated by sampling clock 150, and the audio was synchronized to the video during recording, synchronization between the output video 34 and audio 36 is maintained during playback by the sampling clock 150 derived from the pixel rate line-lock clock 140 and by the data itself.

During playback, DSP 160 requests data from audio output FIFO 98 at roughly the same time that CODEC 60 is requesting the associated video data from decompression FIFO 94. As each frame of video is decompressed through CODEC 60 and played out through video output port 34, video I/O circuit 35 generates a frame interrupt that tells the audio circuit to acquire the next block of audio samples and load them into the audio output stream. DSP 160 uses synch 142 to synchronize the presentation to the DAC 154 of the audio for the corresponding video frame.

Since the audio was synchronized with any incoming video during recording, there are the targeted number of audio samples (e.g., 44,100) for each of two stereo audio channels for each second of video. The tracking of the audio sample rate to the video rate ensures that during any number of video frames, there will be exactly $$\text{number of frames} * \lfloor \frac{\text{audio sample rate}}{\text{video frame rate}} \rfloor$$

samples recorded or played back.

Other embodiments of the invention are within the scope of the claims.

This scheme for synchronizing digital audio to digital video is directly applicable to other forms of digital video/audio, e.g., High Definition TV. Video framing signals (vertical, horizontal, and pixel) will always be present in some form, and as such will be available as sources for deriving ratioed clock(s) to synchronize previously or simultaneously recorded audio information to that video information.

Multiple format video requires translation to single or limited-format audio to maintain audio record and regeneration standards in the presence of different video framing rates. This invention both allows and facilitates the use of multiple video formats with audio separately or simultaneously recorded, and for synchronizing audio to multiple format video on playback. Even though the audio may be initially presented to such a system in digital format, the invention will maintain synchronization of the audio with independently recorded video during playback.

What is claimed is:

1. An audio/video input/output (I/O) apparatus for acquiring digital audio samples from one or multiple channels of input audio and, alternately, synthesizing digital audio samples into one or multiple channels of output audio, the apparatus comprising:

a video I/O port circuit generating a video synchronization signal, said video I/O port circuit comprising a video input port configured to convert input analog video into digital video, and a video output port configured to synthesize output analog video from digital video; and an audio I/O port circuit comprising a frequency synthesizer connected to receive said video synchronization signal from said video I/O port and configured to derive an audio sampling clock based on said video synchronization signal, an audio input port configured to sample and convert input analog audio into digital audio samples according to said sampling clock, and an audio output port configured to synthesize digital audio samples into output analog audio according to said sampling clock.

2. The audio/video I/O apparatus of claim 1 further comprising:

a general purpose computer with a storage device and a peripheral slot; and peripheral interface circuitry installed in said peripheral slot and configured to transfer said digital video and digital audio samples from said audio input and video input ports to said storage device, and to transfer data from said storage device to said audio output and video output ports.

3. The audio/video I/O apparatus of claim 2 wherein said peripheral interface circuitry further comprises FIFOs for coupling asynchronous operation of said computer to synchronous operation of said video and audio input and output ports.

4. The audio/video I/O apparatus of claim 2 wherein said peripheral interface circuitry further comprises a CODEC for compressing said digital video into compressed video data for storing on said storage device and for decompressing said video data as they are transferred from said storage device to said video output port.

5. The audio/video I/O apparatus of claim 1 wherein said frequency synthesizer further comprises:

an oversampled clock synthesizer that generates an oversampled clock whose frequency is at least twice as great as the frequency of said audio sampling clock; and a frequency divider that frequency divides said oversampled clock to generate said audio sampling clock.

6. The audio/video I/O apparatus of claim 1 further comprising a digital signal processor programmed to:

selectively associate a varying number of digital audio samples to each respective frame of said digital video to achieve a precise ratio of the number of said digital audio samples over a finite time to the number of associated frames of said digital video over said finite time; and selectively associate a varying number of said digital audio samples to each respective frame of said digital video as said digital audio samples and said digital video are presented to said video and audio output ports.

7. The audio/video I/O apparatus of claim 1 further comprising a digital signal processor programmed to:

selectively associate a varying number of digital audio samples to each respective frame of said digital video to achieve a precise ratio of the number of said digital audio samples over a finite time to the number of associated frames of said digital video over said finite time; and selectively associate a varying number of said digital audio samples to each respective frame of said digital video as said digital audio samples and said digital video are presented to said video and audio output ports.

8. The audio/video I/O apparatus of claim 1 wherein said audio input port further comprises:

an analog-to-digital converter for converting said input analog audio into said digital audio samples, said analog-to-digital converter being clocked by said audio sampling clock; and a digital-to-analog converter for converting said digital audio samples to said output analog audio, said digital-to-analog converter being clocked by said audio sampling clock.

9. The audio/video I/O apparatus of claim 1 further comprising:

a host computer with a storage device for storing said digital audio samples and said digital video;

first and second FIFOs for storing said digital audio samples between said audio input port and said storage device;

third and fourth FIFOs for storing said digital audio samples between said storage device and said audio output port; and a digital signal processor for controlling flow of said digital audio samples between said first and second FIFOs and said third and fourth FIFOs.

10. An audio/video input apparatus for acquiring one or multiple channels of digital audio samples, the apparatus comprising:

a video input port configured to convert input analog video into digital video and generate a video synchronization signal;

a frequency synthesizer connected to receive said video synchronization signal from said video input port and configured to derive an audio sampling clock based on said video synchronization signal; and an audio input port configured to sample and convert input analog audio into digital audio samples according to said sampling clock.

11. The audio/video input apparatus of claim 10 further comprising:

a general purpose computer with a storage device and a peripheral slot; and peripheral interface circuitry installed in said peripheral slot and configured to transfer said digital video and digital audio samples from said audio input and video input ports to said storage device.

12. The audio/video input apparatus of claim 11 wherein said peripheral interface circuitry further comprises a FIFO for coupling asynchronous operation of said computer to synchronous operation of said video and audio input ports.

13. The audio/video input apparatus of claim 11 wherein said peripheral interface circuitry further comprises a CODEC for compressing said digital video into compressed video data for storing on said storage device.

14. The audio/video input apparatus of claim 10 wherein the video input port further comprises:

a detector configured to detect a synchronizing signal of said input analog video; and a pulse generator configured to provide an input synchronization pulse to said audio input port, said input synchronization pulse being generated for each frame of said input analog video and being based on said detected synchronizing signal.

15. The audio/video input apparatus of claim 10 wherein said frequency synthesizer further comprises:

an oversampled clock synthesizer that generates an oversampled clock whose frequency is at least twice as great as the frequency of said audio sampling clock; and a frequency divider that frequency divides said oversampled clock to generate said audio sampling clock.

16. The audio/video input apparatus of claim 10 further comprising:

a digital signal processor programmed to selectively associate a varying number of digital audio samples to each respective frame of said digital video to achieve an accurate ratio of the number of said digital audio samples over a finite time to the number of associated frames of said digital video over said finite time.

17. The audio/video input apparatus of claim 10 further comprising:

a digital signal processor programmed to selectively associate a varying number of digital audio samples to each respective frame of said digital video to achieve an accurate ratio of the number of said digital audio samples over a finite time to the number of associated frames of said digital video over said finite time.

18. The audio/video input apparatus of claim 10 wherein said audio input port further comprises an analog-to-digital converter for converting said input analog audio into said digital audio samples, said analog-to-digital converter being clocked by said audio sampling clock.

19. The audio/video input apparatus of claim 10 further comprising:

a host computer with a storage device for storing said digital audio samples and said digital video;

first and second FIFOs for storing said digital audio samples between said audio input port and said storage device; and a digital signal processor for controlling flow of said digital audio samples between said first and second FIFOS.

20. An audio/video output apparatus for synthesizing one or multiple channels of digital audio samples into output audio, the apparatus comprising:

a video output port configured to synthesize output analog video from digital video and generating a video synchronization signal;

a frequency synthesizer connected to receive said video synchronization signal from said video output port and configured to derive an audio sampling clock based on said video synchronization signal; and an audio output port configured to synthesize output analog audio from digital audio samples according to said sampling clock.

21. The audio/video output apparatus of claim 20 further comprising:

a general purpose computer with a storage device and a peripheral slot; and peripheral interface circuitry installed in said peripheral slot and configured to transfer data from said storage device to said audio output and video output ports.

22. The audio/video output apparatus of claim 21 wherein said peripheral interface circuitry further comprises a FIFO for coupling asynchronous operation of said computer to synchronous operation of said video and audio output ports.

23. The audio/video output apparatus of claim 21 wherein said video peripheral further comprises a CODEC for decompressing said video data as they are transferred from said storage device to said video output port.

24. The audio/video output apparatus of claim 20 wherein said frequency synthesizer further comprises:

an oversampled clock synthesizer that generates an oversampled clock whose frequency is at least twice as great as the frequency of said audio sampling clock; and a frequency divider that frequency divides said oversampled clock to generate said audio sampling clock.

25. The audio/video output apparatus of claim 20 further comprising:

a digital signal processor programmed to selectively associate a varying number of said digital audio samples to each respective frame of said digital video as said digital audio samples and said digital video are presented to said video and audio output ports.

26. The audio/video output apparatus of claim 20 wherein said audio output port further comprises a digital-to-analog converter for converting said digital audio samples to said output analog audio, said digital-to-analog converter being clocked by said audio sampling clock.

27. The audio/video output apparatus of claim 20 further comprising:

a host computer with a storage device for storing said digital audio samples and said digital video;

first and second FIFOs for storing said digital audio samples between said storage device and said audio output port; and a digital signal processor for controlling flow of said digital audio samples between said first and second FIFOs.

28. A method for acquiring video and one or more channels of audio and storing them in digital form on a storage device of a computer, the method comprising the steps:

receiving said video at a video input port;

generating a video synchronization signal based upon said video;

deriving an audio sampling clock based upon said video synchronization signal;

receiving said audio at an audio input port, said audio input port clocked by said audio sampling clock; and storing said received video and received audio on the storage device.

* * * * *